United States Patent Office 3,132,775
Patented May 12, 1964

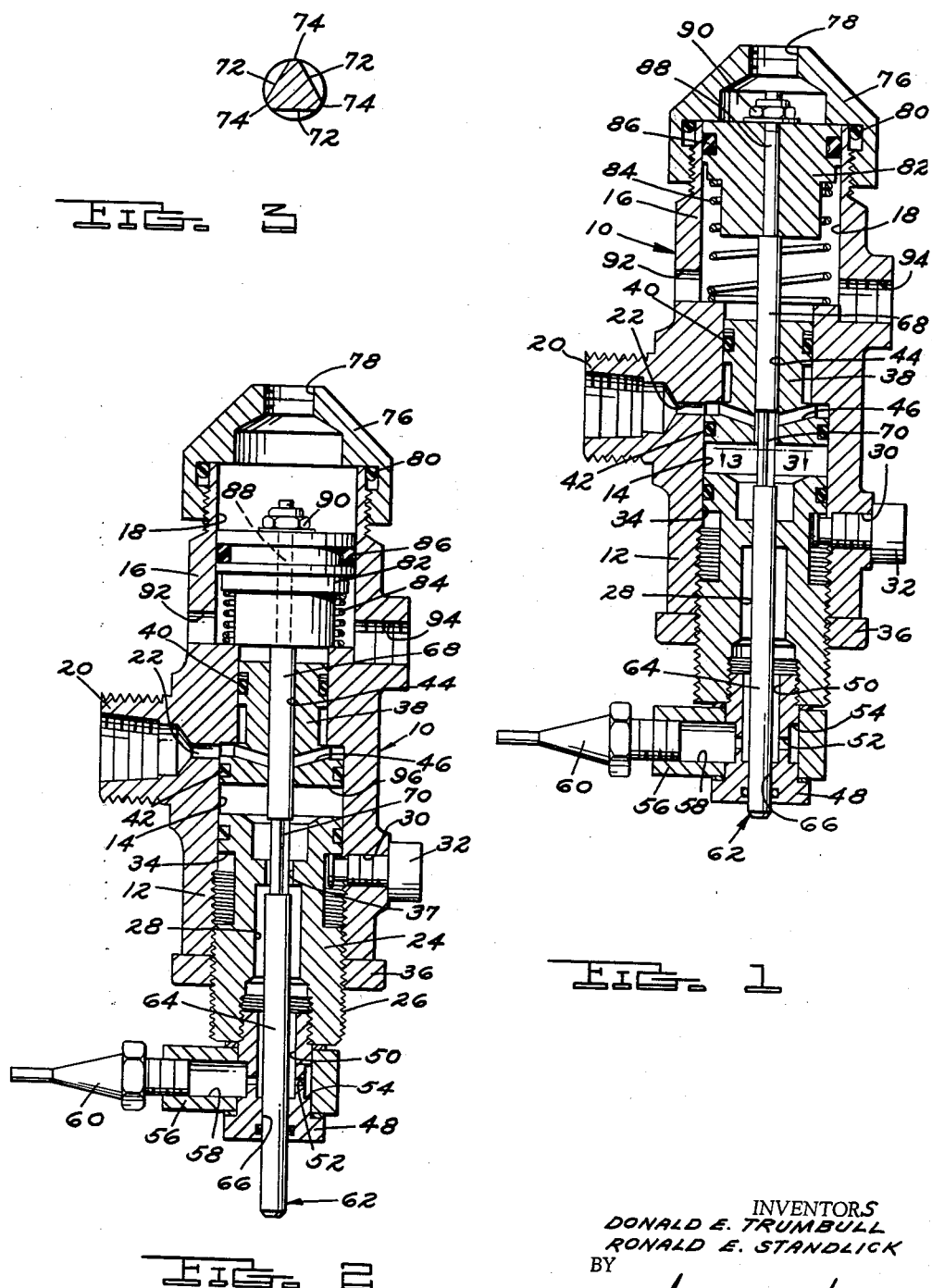

3,132,775
AUTOMATIC METER VALVE
Donald E. Trumbull, Birmingham, and Ronald E. Standlick, Warren, Mich., assignors to Pyles Industries, Inc., Southfield, Mich., a corporation of Michigan
Filed Dec. 3, 1962, Ser. No. 241,576
7 Claims. (Cl. 222—453)

This invention relates to metering and dispensing devices, and in particular to such a device capable of automatically metering and dispensing discrete quanta of flowable materials, commonly known as polyurethanes, polyesters, epoxies and the like.

These materials generally comprise two components, referred to as a base and an accelerator or catalyst, which must be mixed together in accurately metered proportions. In operations requiring the depositing of relatively small volumes of materials, such as in the process of potting small electrical components moving along an assembly line, each successive quantum of material dispensed must be accurately metered and dispensed. A device embodying the instant invention is ideally suited to accurately meter and dispense "shots" or discrete quanta of such materials to a desired location.

The instant device generally comprises a metering chamber to which material is supplied under pressure, and a discharge chamber, through which the material is dispensed. A metering plunger shiftably disposed in the metering chamber is operable to expel material from that chamber, through the discharge chamber to the point of use. Control of the metering function is achieved by a valve rod element which extends through the plunger in the metering chamber and completely through and beyond the discharge chamber. Shifting of the valve rod opens and closes the port between the two chambers, and as the rod extends completely through and beyond the discharge chamber, the volumetric displacement of the rod in such chamber is substantially constant throughout the cycle of operation of the device. Hence the shiftable movement of the valve rod back and forth within the discharge chamber has no effect on the volume of material dispensed, and the size of the dispensed "shot" is governed solely by the shiftable movement of the metering plunger within the metering chamber.

It is therefore the primary object of the invention to provide a metering and dispensing device of the character above described, which device is capable of repetitively metering and dispensing relatively small discrete quanta of material in accurately proportioned "shots."

Other objects, advantages and meritorious features will more fully appear from the following specification, claims and accompanying drawing, wherein:

FIG. 1 is a cross sectional view of a metering and dispensing device embodying the invention showing the metering plunger and the valve rod in their positions for filling the metering chamber with material to be metered and dispensed;

FIG. 2 is a cross sectional view similar to FIG. 1 showing the valve rod shifted to its position for dispensing material from the metering chamber; and FIG. 3 is a cross sectional view of the valve rod taken along line 3—3 of FIG. 1.

Referring now more particularly to the drawing, there is shown a metering and dispensing device comprising a body member 10 having a forward end 12 defining a metering chamber 14 and a rear end 16 defining a fluid pressure chamber 18. A laterally projecting boss 20 on body 10 is provided with a material inlet passage 22 which may be communicatively coupled to a source of material under pressure through a conduit (not shown) coupled to the threaded lengths on the boss 20.

The forward end 12 of body 10 exhibits an internally threaded length adapted to cooperably receive a closure member 24 externally threaded as at 26, which member is bored to define a material discharge chamber 28. Member 24 may be adjustably positioned relative to the body 10, thus selectively varying the volume of metering chamber 14. Body 10 may be provided with an internally threaded aperture 30 into which is threaded a stop screw 32 projecting into an annular undercut 34 on member 24 to limit its axial movement within body 10. Once member 24 is positioned at the desired location, a lock nut 36 threaded on the member is tightened against the forward end 22 of the body to prevent shifting of the member 24 within the body 10. At its end adjacent the metering chamber 14, member 24 is provided with a shoulder defining a port 37 establishing communication between the metering chamber 14 and the discharge chamber 28.

Positioned for shiftable movement within metering chamber 14 is a metering plunger 38, essentially T-shaped in longitudinal cross section, as shown, and is provided adjacent opposite ends with sealing means such as O-rings shown at 40 and 42. Plunger 38 is axially bored as at 44, and has a plurality of transverse passageways 46 in the body of the T establishing communication between inlet 22 and plunger bore 44.

Threadedly received within the forward end of member 24 is a screw 48 axially bored as at 50 to form a continuation of discharge chamber 28. Screw 48 also exhibits a plurality of radial passages 52 opening into an annular undercut 54. Rotatably positioned on screw 48 is a discharge block 56 having a material passageway 58 therein opening laterally with respect to the body 10. A dispensing nozzle 60 may be provided, which is threaded into block 56 as shown. Screw 48 is loosened slightly to permit rotation of block 56 to dispose nozzle 60 at the desired position to dispense material. Once this is done, screw 48 is tightened into member 24, locking block 56 against movement.

A reciprocable valve rod 62 is provided, which extends completely through the plunger 38 and forwardly through the discharge chamber 28, terminating outwardly beyond the screw 48 as shown. The forward portion 64 of rod 62 projects sealingly through a suitable aperture 66 in screw 48, as shown. A rear portion 68 of the rod is machined to be slidably, sealingly engaged within the plunger bore 44. Intermediate its opposite ends, the rod 62 is provided with a relieved portion 70, the configuration of which is shown most clearly in FIG. 3. The rod is provided with undercuts as at 72 to permit flow around the rod as more fully described hereinafter. The arcuately shaped surfaces 74 serve to guide the rod in its travel within port 37 when it is shifted from the position shown in FIG. 1 to the position shown in FIG. 2, and vice versa.

Fluid pressure chamber 18 at the rear of body 10 is provided with a cap 76 having an internally threaded port 78 suitable for coupling to a fluid pressure line (not shown) to deliver fluid pressure to the chamber 18. An O-ring seal 80 may be provided as shown to prevent escape of pressure fluid around cap 76. A fluid pressure piston 82 is disposed for reciprocable movement within chamber 18, and is yieldingly biased toward the rear of the chamber by a coil spring 84. Piston 82 is of suitable conventional construction, and has a sealing ring 86 positioned thereon to prevent by-pass of pressure fluid past the piston. A rearwardly projecting threaded extension 88 on valve rod 62 extends through piston 82 and is secured for movement with the piston by a nut 90. A relief passageway 92 communicates with chamber 18 to prevent any build up of fluid pressure within the chamber forwardly of piston 82. An internally threaded aperture 94 may also be provided in body 10 into which a bolt or the like may be threaded for mounting the device on a suitable bracket (not shown).

With the metering and dispensing device mounted in a position to dispense material at a desired location, a source of material under pressure is coupled to the threaded boss 20, and a source of fluid under pressure is coupled to the cap 76. Member 24 is adjustably positioned within body 10 to provide a metering chamber 14 having a volume equal to the desired volume of material to be dispensed. Screw 48 is loosened, and block 56 rotated to dispose nozzle in the correct dispensing position and screw 48 tightened to lock the nozzle in place. To begin operation, it is necessary that the metering and discharge chambers and material passage be purged of air and completely filled with material. To accomplish this, the device is operated repeatedly until material begins to flow through nozzle 60, in an identical manner to the operation described herebelow.

To begin dispensing, the device is in the condition shown in FIG. 1. Port 78 is depressurized, shifting piston 82 and valve rod 62 rearwardly, and allowing material under pressure to flow through inlet passage 22, plunger passages 46, past the relief 70 in rod 62, and via plunger bore 44 into metering chamber 14. Chambers 14, 18 and 50, and passages 52, 54, 58 and nozzle 60 are all completely filled with material. Valve rod 62 is blocking port 37, so no material is permitted to flow. This static condition is maintained until the valve rod 62 is shifted to open port 37.

When it is desired to dispense a measured quantum or "shot" of material from nozzle 60, port 78 is pressurized, shifting piston 82 and valve rod 62 to the position shown in FIG. 2. Valve relief 70 is now juxtaposed in port 37, permitting material to flow therethrough. The pressure of incoming material acts against the rear face of the head of T-shaped plunger 38, shifting the plunger forward in metering chamber 14 to expel material. Material cannot enter the chamber 14 from inlet 22 during the plunger's stroke because the rear portion 68 of the valve rod 62 blocks passages 46 during the entire movement of the plunger to expel material. The volume of material dispensed is thus exactly equal to the volume displaced by the movement of plunger 38.

As plunger 38 reaches the forward end of its travel, it abuts the rear face of member 24, which halts the plunger. Upon depressurization of port 78, piston 82 and valve rod 62 are shifted rearwardly under the urging of spring 84. This disposes the forward end 64 of the rod 62 blocking port 37, and the relieved portion 70 opposite the plunger passages 46. From FIG. 1 it can be seen that the rod portion 70 is of sufficient length to uncover plunger passages 46 throughout the length of the stroke of plunger 38 when the rod is in its retracted position. Likewise, when the rod 62 is in its extended position as shown in FIG. 2, the rear portion 68 of the rod effectively blocks plunger passages 46 throughout the stroke of the plunger. Therefore, with the plunger 38 at its forward extremity of travel, rearward shifting of valve rod 62 opens passages 46 allowing material to flow into the metering chamber 14 forwardly of the plunger. As the effective area of the forward face 96 of the plunger is greater than the effective area of the rear face 98, the pressure of incoming material causes the plunger to shift rearwardly in chamber 14 until it reaches its fully retracted position as shown in FIG. 1, with rod 62 blocking port 37. Valve rod 62 is so proportioned that the relieved portion 70 cannot be positioned to simultaneously open both port 37 and plunger passages 46.

As can be seen from FIGS. 1 and 2, the forward extremity of valve rod 62 projects outwardly beyond the end of screw 48 at all positions of valve rod movement. Thus the volumetric displacement of the rod within the various chambers containing material remains substantially constant at all times. There is therefore no tendency of the rod to expel material from nozzle 60 due to an increase in volume displacement within chambers 28 and 50 when the rod shifts forwardly, or to suck material back into these chambers due to a decrease in displacement when the rod is shifted rearwardly. The volume of material dispensed from the device during each cycle of operation is hence solely determined by the volumetric displacement of plunger 38 during its forward movement within the metering chamber 14.

Although the metering and dispensing device is shown in the drawing so that material flows therethrough generally downwardly, it may be mounted in any desired position, as the flow is not dependent on gravity, but on the pressure of incoming material.

What is claimed is:

1. In a metering and dispensing device to which material is supplied under pressure, a metering chamber having a material inlet coupled to a source of said material; a discharge chamber having an outlet through which material is dispensed; a port establishing material conducting communication between said chambers; means for controlling the flow of material through said port, said means including a shiftable valve rod normally blocking said port and having a relieved portion shiftable into juxtaposition with the port permitting material flow therethrough, said means further including a metering plunger and valve means operable within the chamber to fill the chamber when said rod is blocking to port and to expel material from the chamber through the port when the rod is shifted to its position opening the port, said valve rod extending completely through said discharge chamber and projecting outwardly therebeyond in all positions of rod movement to maintain the volumetric displacement of the rod within the discharge chamber substantially constant at all times.

2. In a metering and dispensing valve to which material to be dispensed is supplied under pressure, a metering chamber having a material inlet, a discharge chamber, a port establishing communication between said chambers, a metering plunger disposed within the metering chamber for shiftable movement to expel material from the chamber and having a passageway therethrough communicating with said inlet, a valve rod element extending through the metering plunger passageway and through said port and having a relieved portion therealong, said valve rod being shiftable from a position opening said passageway in the plunger and blocking said port for filling the chamber with material, to a position closing said passageway and opening said port permitting shiftable movement of said plunger to expel material from the metering chamber, said valve rod extending completely through said discharge chamber and projecting outwardly therebeyond at both extremities of the rod stroke to maintain the volumetric displacement of the rod within the discharge chamber substantially constant at all times.

3. In a metering and dispensing device to which material to be dispensed is supplied under pressure, a metering chamber having an inlet for material under pressure; a discharge chamber having a material discharge aperture through which material is dispensed; a port establishing material communication between said chambers; a metering plunger disposed for shiftable movement within the metering chamber to expel material therefrom through said port, said plunger having an axial passageway therethrough; an elongate valve rod element having opposite end portions adapted to sealingly engage said plunger passageway and said port respectively and an intermediate relieved portion, said valve rod being shiftable from a position disposing said relieved portion in juxtaposition with said plunger passageway for filling said metering chamber with material to a position disposing said relieved portion in juxtaposition with said port for expelling material from the metering chamber through the port, with one end portion of the rod blocking the port when the rod is in its first mentioned position and with the opposite end portion of the rod blocking said plunger passageway when the rod is shifted to said second mentioned position and throughout the entire stroke of said metering plunger toward the port to expel material from the metering chamber; said valve rod element extending completely through said discharge chamber and projecting outwardly therebeyond at every position of shiftable movement of the rod to maintain the volumetric displacement of the rod within the discharge chamber consant whereby the volume of material displaced through said discharge aperture by the shifting of said plunger is unaffected by the movement of the valve rod within such chamber.

4. In a metering and dispensing device to which material is delivered under pressure, a metering chamber, a discharge chamber, a port establishing communication between said chambers, means for selectively opening and closing said port including a shiftable valve rod extending through the port normally blocking the same and having a relieved portion movable into the port to permit material flow, said means further including a metering plunger and valve means in the metering chamber selectively operable to fill the metering chamber with material when the port is closed and to expel material therefrom when the port is open; a material discharge block mounted encircling said discharge chamber remote from said port and having a laterally opening spout-like prolongation communicating with the discharge chamber through which material is dispensed, said block being rotatable relative to said discharge chamber to dispose the spout in any predetermined angular position for dispensing material therefrom in a desired direction, said valve rod extending completely through said discharge chamber and projecting outwardly therebeyond at all positions of valve rod movement to maintain the volumetric displacement of the rod within such chamber substantially constant at all times.

5. A metering and dispensing device to which material to be dispensed is supplied under pressure, comprising: a body member defining an enclosed metering chamber having an inlet for said material; a discharge block coupled to said body defining a discharge chamber coaxial with said metering chamber, and a dispensing member rotatably encircling said discharge block spaced from said body and including a laterally projecting tubular conduit through which material is dispensed; a port establishing communication between said chambers; said discharge block provided with radially opening aperture means communicating between said discharge chamber and said tubular conduit at all positions of rotation of the dispening member relative to said block; a metering plunger disposed for shiftable movement within said metering chamber to expel material therefrom through the port and having an axial passageway therethrough; a valve rod extending through said plunger passageway and through said port and shiftable from a first position opening the plunger passageway and closing the port to a second position closing the plunger passageway and opening the port; and means coupled to said valve rod to shift the rod to its first position for filling the metering chamber with material and to its second position for expelling material from the metering chamber, said valve rod projecting forwardly completely through said discharge chamber and terminating outwardly therebeyond at both extremities of rod stroke to maintain the volumetric displacement of the rod within the discharge chamber substantially constant.

6. The invention as defined in claim 5 characterized in that said valve rod exhibits an intermediate relieved portion positioned juxtaposed with said plunger passageway when the rod is in said first position to permit material flow from the inlet into the metering chamber and positioned juxtaposed with said port when the rod is shifted to said second position to permit material flow from the metering chamber through the port.

7. A material dispensing device to which material to be dispensed is supplied under pressure, comprising: an enclosed metering chamber having an inlet for material under pressure; a material piston disposed in the metering chamber for shiftable movement and having a rear face exposed to said inlet and a front face adjacent said outlet, said piston provided with an axial bore and passageway means establishing material conducting communication between said material inlet and the piston bore; a discharge chamber axially aligned with said metering chamber; a port establishing communication between said chambers; an elongate valve rod extending axially through said piston bore and projecting through said port and shiftable from a position opening said passageway means to said bore and closing the outlet to a position closing said passageway means and opening the outlet; means coupled to said valve member to shift the same; said material piston responsive to a differential in material pressure on opposite faces thereof to be shifted away from the outlet to fill the chamber in front of the piston when the passageways are open and the port is closed, and to be shifted toward the port to expel material when the port is open and the passageways are closed; said valve rod extending completely through said discharge chamber and projecting therebeyond throughout movement of the rod to maintain the volumetric displacement of the rod within the discharge chamber substantially constant, said discharge chamber exhibiting a discharge opening space from said port through which material is dispensed.

No references cited.